United States Patent
Römer

(10) Patent No.: US 11,186,205 B2
(45) Date of Patent: Nov. 30, 2021

(54) MOTOR VEHICLE SEAT

(71) Applicant: Faurecia Autositze GmbH, Stadthagen (DE)

(72) Inventor: Bernd Römer, Stadthagen (DE)

(73) Assignee: Faurecia Autositze GmbH, Stadthagen (DE)

(*) Notice: Subject to any disclaimer, the term of this patent is extended or adjusted under 35 U.S.C. 154(b) by 0 days.

(21) Appl. No.: 16/838,754

(22) Filed: Apr. 2, 2020

(65) Prior Publication Data
US 2020/0317092 A1 Oct. 8, 2020

(30) Foreign Application Priority Data
Apr. 3, 2019 (DE) ................. 10 2019 108 663.9

(51) Int. Cl.
| | | |
|---|---|---|
| *B60N 2/80* | (2018.01) | |
| *B60N 2/22* | (2006.01) | |
| *B60N 2/23* | (2006.01) | |
| *B60N 2/02* | (2006.01) | |
| *B60N 2/68* | (2006.01) | |

(Continued)

(52) U.S. Cl.
CPC ......... *B60N 2/2222* (2013.01); *B60N 2/0232* (2013.01); *B60N 2/23* (2013.01); *B60N 2/68* (2013.01); *A47C 7/38* (2013.01); *B60N 2/853* (2018.02); *B60N 2/862* (2018.02); *B60N 2/865* (2018.02); *B60N 2/868* (2018.02); *B60N 2002/0236* (2013.01)

(58) Field of Classification Search
CPC ........ B60N 2/853; B60N 2/862; B60N 2/865; B60N 2/868; B60N 2/2222; B60N 2/22; B60N 2/0232; A47C 7/38
See application file for complete search history.

(56) References Cited

U.S. PATENT DOCUMENTS 7,845,729 B2* 12/2010 Yamada .............. B60N 2/0232
297/284.1
8,702,173 B2* 4/2014 Adams ..................... A47C 7/38
297/408

FOREIGN PATENT DOCUMENTS

| DE | 10 2006 045 387 A1 | 10/2007 |
| DE | 20 2015 106 892 U1 | 1/2016 |
| DE | 10 2016 121 973 A1 | 6/2017 |

OTHER PUBLICATIONS

German Search Report dated Dec. 18, 2019 with respect to counterpart German patent application 10 2019 108 663.9.

(Continued)

*Primary Examiner* — Syed A Islam
(74) *Attorney, Agent, or Firm* — Henry M. Feiereisen LLC

(57) ABSTRACT

The invention relates to a motor vehicle seat for motor vehicles comprising an adjustment device for a backrest head adjustment, the motor vehicle seat having a backrest, which has a backrest frame as the first component of the backrest head adjustment and a backrest head as the second component of the backrest head adjustment, and an actuator. The backrest head is pivotably connected to the backrest frame and the actuator has a driving element and a movable element, the actuator being connected to the backrest frame and the backrest head and it being possible to carry out a linear movement by means of the actuator. The driving element of the actuator is rigidly connected to the backrest frame or backrest head and the movable element of the actuator has a guide element which engages in a guide arranged on the backrest frame or backrest head.

7 Claims, 3 Drawing Sheets

(51) Int. Cl.
    *B60N 2/865*     (2018.01)
    *B60N 2/868*     (2018.01)
    *B60N 2/862*     (2018.01)
    *A47C 7/38*     (2006.01)
    *B60N 2/853*     (2018.01)

(56) References Cited

OTHER PUBLICATIONS

Translation of German Search Report dated Dec. 18, 2019 with respect to counterpart German patent application 10 2019 108 663.9.

* cited by examiner

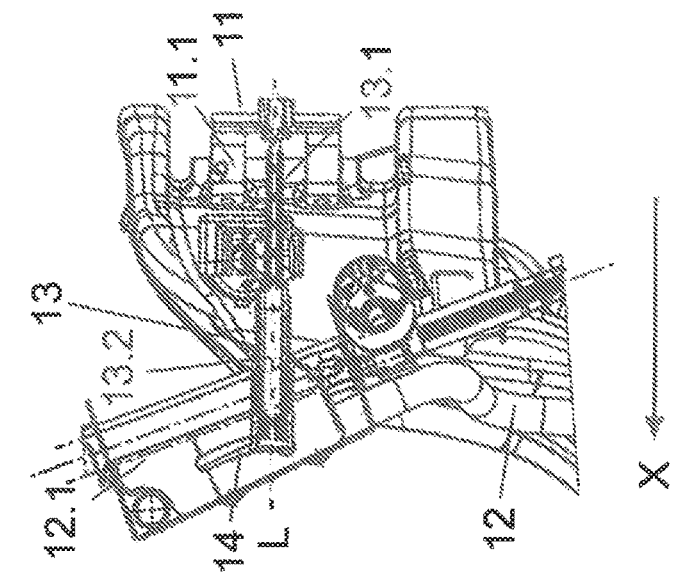
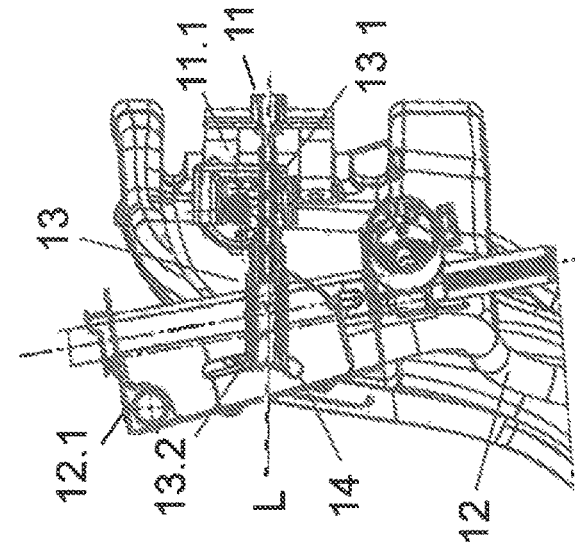
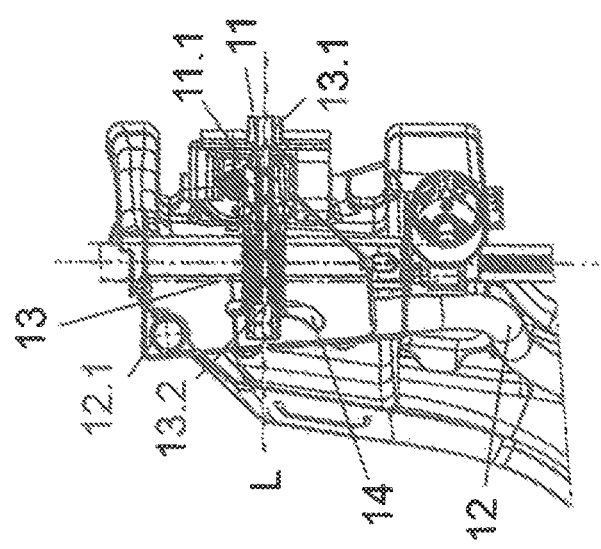

MOTOR VEHICLE SEAT

CROSS-REFERENCES TO RELATED APPLICATIONS

This application claims the priority of German Patent Application, Serial No. 10 2019 108 663.9, filed Apr. 3, 2019, pursuant to 35 U.S.C. 119(a)-(d), the disclosure of which is incorporated herein by reference in its entirety as if fully set forth herein.

BACKGROUND OF THE INVENTION

The present invention relates to a motor vehicle seat.

Motor vehicle seats for motor vehicles usually have a backrest in order to support the back of an occupant in various positions of the backrest, in particular to hold the back of the occupant in a substantially upright position during a frontal impact of the motor vehicle and thus to reduce the risk of injury to the occupant. The backrest can be pivoted to increase seating comfort. In addition, there is the possibility of separating the backrest and pivoting its upper region separately with respect to the lower region of the backrest. This design allows additional adjustment options; the backrest can be individually adjusted depending on the body shape and size of the occupant.

To date, conventional motor vehicle seats have various disadvantages. In particular in the event of an accident in which strong forces act along the longitudinal axis of the motor vehicle seat, for example in the event of a frontal impact, the stability of the upper region of the backrest cannot be guaranteed and can thus increase the risk of injury to an occupant. In addition, the stability of the upper region of the backrest is minimal in the event of a side impact. In addition, the achievable pivot angles of the upper region of the backrest are small; in the event of a crash, an occupant can slip under the belt, for example in a lying position, when the backrest is inclined correspondingly.

It would therefore be desirable and advantageous to provide an improved motor vehicle seat to obviate prior art shortcomings and to minimize transverse forces which in the event of a crash, are produced on an actuator in an upper pivotable region of the backrest and at the same time to prevent an occupant from sliding under the belt.

SUMMARY OF THE INVENTION

According to one aspect of the present invention, a motor vehicle seat includes an adjustment device for a backrest head adjustment has a backrest and an actuator. The backrest has a backrest frame as the first component of the backrest head adjustment and a backrest head as the second component of the backrest head adjustment. The backrest head is designed such that it is pivotably connected to the backrest frame. The actuator is connected to the backrest frame and the backrest head and has a driving element and a movable element. The movable element is mounted so as to be movable with respect to the driving element. A linear movement can be carried out by means of the actuator. According to the invention, the driving element of the actuator is rigidly connected to the backrest frame or the backrest head such that the driving element of the actuator does not perform any pivoting movement with respect to the fastening point of the driving element of the actuator during the linear movement. The movable element of the actuator has a guide element which engages in a guide arranged on the backrest frame or backrest head.

The driving element is rigidly connected to a component of the backrest head adjustment as an abutment. Due to the linear movement of the actuator, the backrest head performs a pivoting movement with respect to the backrest frame. The guide element of the movable element is guided in a guide. The backrest typically has two actuators which are spaced apart and parallel to one another at the same height as the backrest. In this way, each actuator rests on two fixed points, which significantly increase the stability of the backrest head in the event of a crash compared to the solutions known from the prior art.

According to another advantageous feature of the invention, the actuator can include a motor for driving the actuator. A motor drive increases the comfort for the user.

According to another advantageous feature of the invention, the actuator can be designed as a spindle drive. The spindle drive has a spindle having an external thread which engages in a spindle nut having an internal thread.

According to another advantageous feature of the invention, a spindle can be fastened to the backrest frame or to the backrest head and a spindle nut can be fastened to the other component of the backrest head adjustment. It is possible to fasten the spindle to the backrest frame and the spindle nut to the backrest head or, conversely, to fasten the spindle to the backrest head and the spindle nut to the backrest frame. It is only important for both parts of the spindle drive to be fastened to both components of the backrest head adjustment.

According to another advantageous feature of the invention, the guide can describe a curve. In a development of the invention, the curve has the shape of an involute. The guide element is mounted in the guide and its movement can be guided along the curve of the guide. The linear movement of the actuator is thus converted into a pivot movement.

According to another advantageous feature of the invention, the actuator has a longitudinal axis which is arranged in parallel with the direction of movement of the actuator. The curve of the guide is designed such that the direction of the longitudinal axis of the actuator with respect to the backrest frame and/or the backrest head remains unchanged in any position of the backrest head. The direction of the longitudinal axis points in the direction of travel of the motor vehicle. The forces occurring during a frontal impact occur along the spindle drive and thus ensure a high stability of the adjustment device, since transverse forces acting on the spindle are prevented.

According to another advantageous feature of the invention, the longitudinal axis of the actuator can extend in parallel with the direction of travel of the motor vehicle. The forces occurring during a frontal impact occur along the spindle drive and thus ensure a high stability of the adjustment device.

According to another advantageous feature of the invention, the driving element of the actuator can be connected to the backrest frame and the movable element of the actuator can be connected to the backrest head. A reverse arrangement is also possible, in which the driving element of the actuator is connected to the backrest head and the movable element of the actuator is connected to the backrest frame. Both arrangements allow the backrest head to pivot relative to the backrest frame due to the linear movement of the actuator.

According to another aspect of the present invention, a method for adjusting a backrest head with respect to a backrest frame of a motor vehicle seat by means of an actuator is designed in such a way that the actuator carries out a linear movement. For this purpose, the actuator has a movable element which has a guide element. The guide element is mounted so as to be movable with respect to a guide and is guided in a guide during the linear movement of the actuator.

The driving element can be rigidly connected to a component of the backrest head adjustment as an abutment. Due to the linear movement of the actuator, the backrest head performs a pivoting movement with respect to the backrest frame. The guide element of the movable element is guided in a guide. In this way, each actuator rests on two fixed points, which significantly increase the stability of the backrest head in the event of a crash compared to the solutions known from the prior art.

According to another advantageous feature of the invention, the guide can be arranged in the backrest frame or in the backrest head. The guide can be, for example, a rail or a slot or similar.

According to another advantageous feature of the invention, the guide element of the actuator can be guided in the guide such that the longitudinal axis of the actuator maintains its orientation with respect to the direction of travel of the motor vehicle during the linear movement of the actuator. The direction of the longitudinal axis points in the direction of travel of the motor vehicle. The forces occurring during a frontal impact occur along the spindle drive and thus ensure a high stability of the adjusting device, while transverse forces on the spindle are prevented or at least reduced.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2a is a side view of a backrest head adjustment, with the backrest head not adjusted;

FIG. 2b is a side view of the backrest head adjustment, with the backrest head being adjusted;

FIG. 2c is a side view of the backrest head adjustment, with the backrest head fully adjusted;

DETAILED DESCRIPTION OF PREFERRED EMBODIMENTS

Figure 1A:
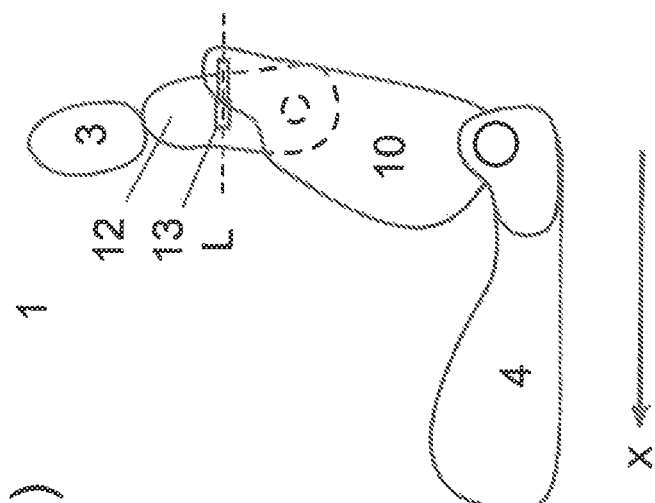
FIG. 1a is a schematic illustration of a motor vehicle seat according to the present invention for motor vehicles, with a backrest head not adjusted.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Figure 1B:
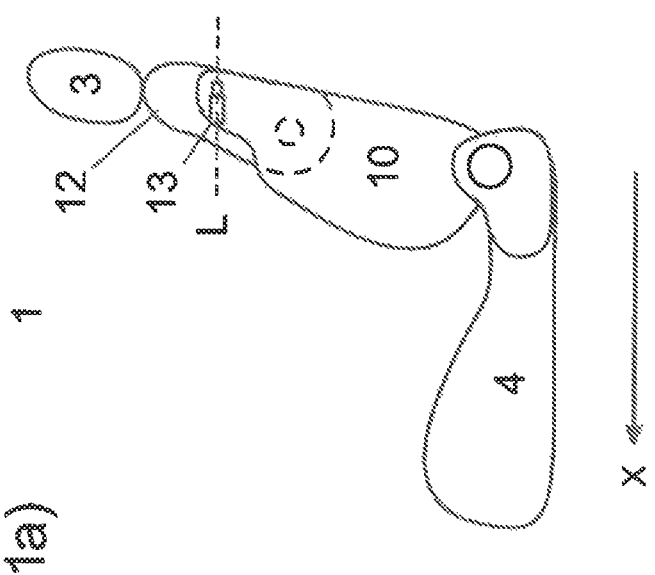
FIG. 1b is a schematic illustration of the motor vehicle seat, with the backrest head being adjusted.

Turning now to the drawing, and in particular to FIGS. 1a, 1b, there are shown schematic illustrations of a motor vehicle seat according to the present invention, generally designated by reference numeral 1 for motor vehicles. The motor vehicle seat 1 includes a backrest head 12 which can be adjusted by a backrest head adjustment. In all of the embodiments shown here, the motor vehicle seat 1 is arranged in the motor vehicle such that an occupant of the motor vehicle seat 1 looks in the direction of travel X of the motor vehicle. The motor vehicle seat 1 comprises a seat 4, a backrest 10 and a headrest 3 (FIG. 1a). The backrest head 12 forms the upper part of the backrest 10 and is mounted so as to be pivotable relative to the lower part of the backrest 10. The actuator 13 connects the backrest head 12 to the lower part of the backrest 10.

In order to adjust the backrest head 12, the actuator is activated in such a way that it carries out a linear movement (FIG. 1b). The adjustment can be carried out manually or by motor, usually by an electric motor. During the adjustment of the backrest head 12, the longitudinal axis of the actuator L maintains its orientation in parallel with the direction of travel X of the motor vehicle.

FIG. 2 is a side view of the backrest head adjustment. The actuator 13 is designed as a spindle drive and has a driving element 13.1 and a movable element 13.2. Typically, the driving element 13.1 is a spindle and the movable element 13.2 is a spindle nut. In this embodiment, the driving element 13.1 is connected to the backrest frame 11 by the component of the backrest frame 11.1 and the movable element 13.2 is movably mounted in the guide 14 by the component of the backrest head 12.1 with the backrest head 12.

To adjust the backrest head 12, the driving element 13.1 of the actuator 13 is rotated about the longitudinal axis L thereof (FIG. 2b, 2c). The movable element 13.2 is moved linearly in the direction of travel of the motor vehicle X by this rotation and adjusts the backrest head 12 by an angle to the backrest frame 11. The longitudinal axis of the actuator L maintains its orientation in parallel with the direction of travel X of the motor vehicle, because the movable element 13.2 is guided in the guide 14, which has the shape of an involute portion.

Figure 3A:
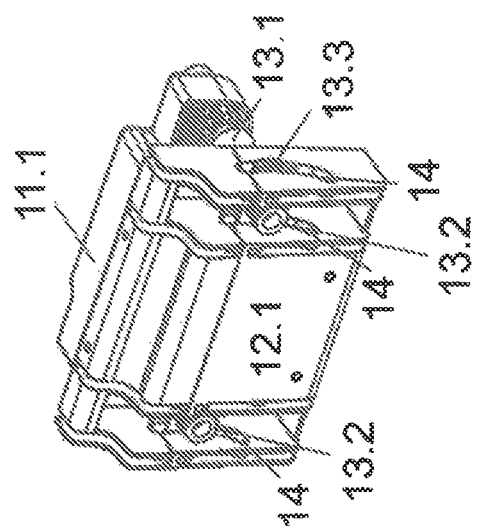
FIG. 3a a detailed side view of the backrest head adjustment.
Figure 3B:
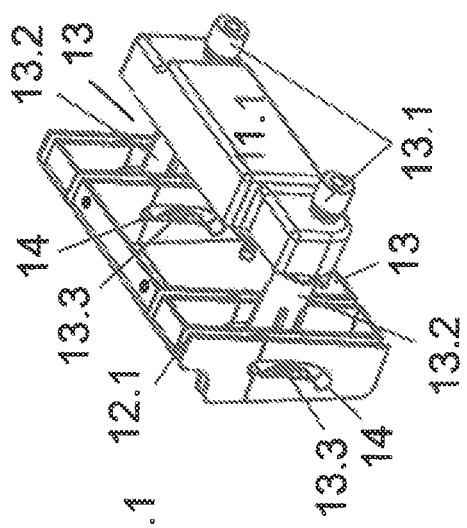
FIG. 3b a detailed perspective view of the backrest head adjustment.
Figure 3C:
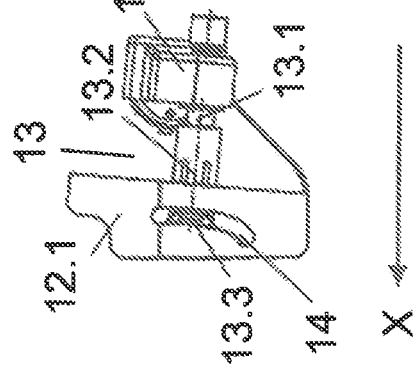
FIG. 3c is another detailed perspective view of the backrest head adjustment.

FIG. 3 is a detailed view of the backrest head adjustment from three different perspectives. In this embodiment, the backrest head 12 is adjusted by means of two actuators 13, the driving elements 13.1 of which are arranged in parallel with one another. The driving elements 13.1 are connected to the backrest frame 11 by the components of the backrest frame 11.1, and the movable elements 13.2, in which the driving elements 13.1 engage, are each movably mounted in a guide 14 by the component of the backrest head 12.1 with the backrest head 12.

To adjust the backrest head 12, the driving elements 13.1 of the actuators 13 are rotated about the longitudinal axis L thereof. The two driving elements 13.1 can be driven by one motor in each case. There is also the possibility of driving the two driving elements 13.1 simultaneously by means of one motor. The driving elements 13.1 can also be operated manually. The movable elements 13.2 are moved linearly in the direction of travel of the motor vehicle X by the rotation and adjust the component of the backrest head 12.1 by an angle to the component of the backrest frame 11.1.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A motor vehicle seat for a motor vehicle, said motor vehicle seat comprising:
   a backrest including a backrest frame as a first component of a backrest head adjustment;
   a backrest head forming a second component of the backrest head adjustment, said backrest head being pivotably connected to the backrest frame; a
   an actuator connected to the backrest frame and the backrest head and including a first driving element which is rigidly connected to one of the backrest frame or backrest head, and a movable element which includes a guide arranged on the other one of the backrest frame or the backrest head, and a guide element engaging in the guide, said actuator being configured to enable execution of a linear movement;
   wherein the guide is configured to describe a curve;
   wherein the actuator defines a longitudinal axis extending in parallel relation to a direction of movement of the actuator, said curve of the guide being configured such that a direction of the longitudinal axis of the actuator with respect to the backrest frame and/or the backrest head remains unchanged in any position of the backrest head; and
   wherein the longitudinal axis of the actuator extends in parallel relation to a direction of travel of the motor vehicle.

2. The motor vehicle seat of claim 1, wherein the actuator includes a motor for driving the actuator.

3. The motor vehicle seat of claim 1, wherein the actuator is configured as a spindle drive.

4. The motor vehicle seat of claim 3, wherein the spindle drive includes a spindle fastened to one of the backrest frame or the backrest head and a spindle nut fastened to the other one of the backrest frame or the backrest head of the backrest head adjustment.

5. The motor vehicle seat of claim 1, wherein the driving element is connected to the backrest frame and the movable element is connected to the backrest head.

6. A method for adjusting a backrest head of a backrest relative to a backrest frame of the backrest via an actuator, said method comprising:
   enabling the actuator to execute a linear movement with the actuator including a movable element having a guide element;
   guiding the guide element in a guide during the linear movement of the actuator;
wherein the actuator defines a longitudinal axis in parallel relation to a direction of movement of the actuator, wherein the guide element of the actuator is guided such that the longitudinal axis of the actuator maintains its orientation with respect to one of the backrest head or backrest frame of the backrest during the linear movement of the actuator, and
   wherein the guide element of the actuator is guided such that the longitudinal axis of the actuator maintains its orientation with respect to a direction of travel of the motor vehicle during the linear movement of the actuator.

7. The method of claim 6, further comprising arranging the guide in the backrest frame or in the backrest head.

* * * * *